Figure 1:
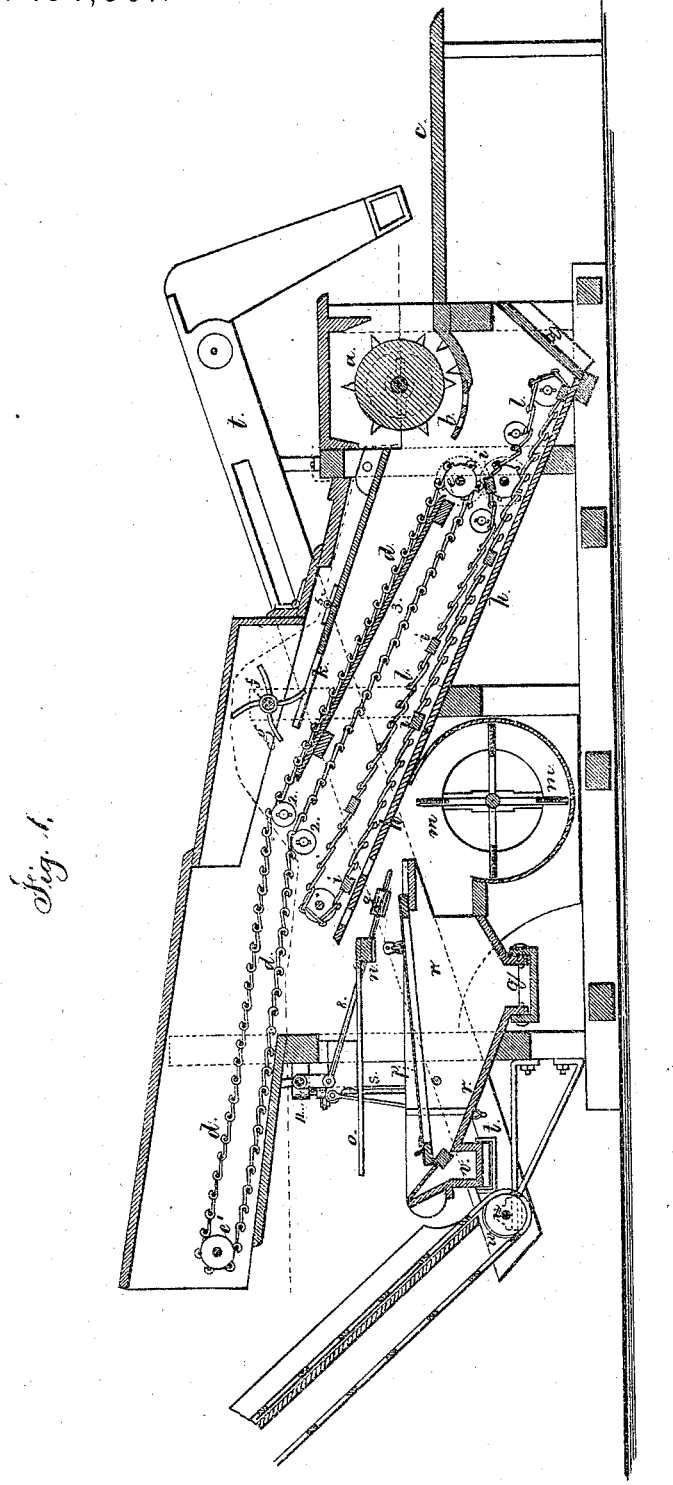

D. O. B. LADD.
Thrashing-Machines.

No. 134,901. Patented Jan. 14, 1873.

Witnesses
Chas. H. Smith
Geo. D. Walker

Inventor.
Dennis O. B. Ladd
Lemuel W. Serrell

2 Sheets--Sheet 2.
D. O. B. LADD.
Thrashing-Machines.
No. 134,901. Patented Jan. 14, 1873.
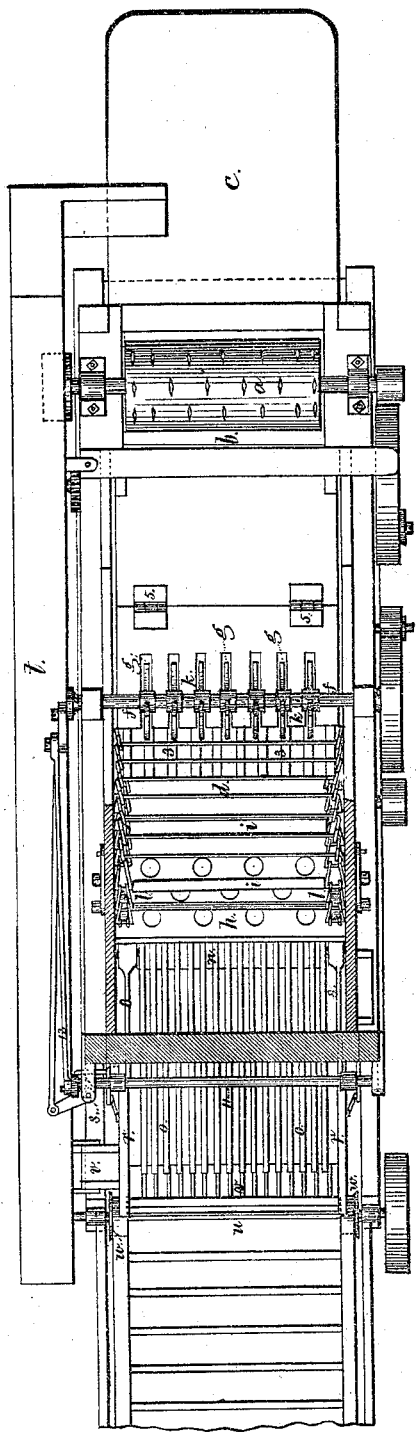
Witnesses,
Chas. H. Smith
Geo. D. Walker
Inventor
Dennis O. B. Ladd.
Lemuel W. Serrell

UNITED STATES PATENT OFFICE.

DENNIS O. B. LADD, OF RACINE, WISCONSIN, ASSIGNOR TO HIMSELF AND P. E. MERRIHEW, OF FAIR HAVEN, MASSACHUSETTS.

IMPROVEMENT IN THRASHING-MACHINES.

Specification forming part of Letters Patent No. 134,901, dated January 14, 1873.

*To all whom it may concern:*

Be it known that I, DENNIS O. B. LADD, of Racine, in the State of Wisconsin, have invented an Improvement in Grain-Separators, of which the following is a specification:

This invention is for more rapidly and perfectly separating grain from the straw, chaff, and refuse matter.

The straw and grain are thrown by the thrashing-cylinder upon a chain-apron and carried upwardly and into contact with revolving pickers that loosen the straw and cause the grain and chaff to fall through fingers upon an incline, over which scrapers drawn by a chain move; the grain falls through holes in this incline and is winnowed by a blast from a fan. The chaff is blown over a sieve, and the heavier portions are delivered from the end of the incline upon prongs or fingers that receive a shaking motion. The refuse is blown away, and the heads containing grain fall into a lateral chute and are returned to the thrashing-table. The mechanism for elevating the straw upon the stack is driven by the same shaft as the elevator that returns the heads to the thrashing-table.

In the drawing, Figure 1 is a vertical longitudinal section of the machine; and Fig. 2 is a plan with a portion of the cover removed.

The thrashing-cylinder $a$ and its concave $b$ are of usual character. The grain is laid in bundles open upon the table $c$ and fed in, as usual.

The chain endless apron $d$ is made of cross-wires, with the ends bent up and hooked to the next cross-wire, as in Letters Patent No. 99,093, the said apron passing over the driving-pulley $e$, and at the far end around the guide-pulley $e'$, and being supported by the intermediate rollers 2 2. Beneath the chain-apron $d$ is an incline, 3, of slats, that prevent the air passing with the grain and straw from the rotary cylinder $a$ blowing the straw through the chain-apron. The shaft $f$ carries the fingers $g$ that revolve above the chain-apron, and lift and loosen the straw so as to allow the grain to fall through the apron upon the incline $h$; and to prevent the straw winding around the fingers $g$ and shaft $f$ a slotted detainer, $k$, is employed, through which the fingers $g$ act, and this detainer is hinged at 5, so that the slotted end may yield to any accumulation of straw passing upon the apron. The chains $l$ carry cross-bars $i$, that serve to draw up the incline $h$, the grain and chaff falling through the belt or apron $d$; and near the top of this incline there are holes that allow the grain and smaller portions to fall through and be winnowed by the action of a blast of air from the rotary blower $m$.

The belting or gearing employed for driving the thrasher-cylinder, the chain-apron $d$, and the chain $l$, and scrapers $i$, are to be of any desired character; I have represented pulleys in the plan, Fig. 2, for belts; and the blower $m$ and shaft $f$ for the fingers $g$ should also be driven by belts.

At the end of the incline $h$, but below it, is a cross-bar, $n$, with side rods 8, sliding in guide-eyes 9, and to this cross-bar $n$ the prongs $o$ are connected. A reciprocating motion is given to these prongs $o$ by the rock-shaft 11, to the arms of which the side rods 8 are connected; and a crank at the end of the shaft $f$, with a rod, 12, moves this rock-shaft 11, and shakes the prongs to separate and open the chaff that is delivered upon them from the incline $h$, the mass being at the same time exposed to the blast of air. The chaff by this motion is tossed upon the fingers or prongs. The grain falls upon the sieve $p$ that is in the shaking-shoe $r$, said shoe being hung by rods, as usual, and shaken by the vertical rock-shaft $s$ and connection to the crank at the end of the shaft $f$. The grain passes through the sieve $p$ and is delivered by the chute $q$, and any heads of grain or unthrashed matter passes off the sieve $p$ into the transverse chute $v$, and is returned by the elevator $t$ to the thrashing-table. The cross-shaft $u$ is supported by journals upon the frame of the machine, and extends into the elevator-trough $t$ and drives the buckets; and upon this same shaft are the drums or pulleys $w$ that receive the chain of the stacking mechanism and drive the same.

By this arrangement, I am enabled to simplify the construction of the parts and to drive the stacker by the same shaft that acts upon the elevator.

The frame of the machine, the side-boards, and the movable covers over the machine are of the usual construction, and do not require further description.

I claim as my invention—

1. The revolving fingers $g$, in combination with the detainer $k$, for the purposes set forth.

2. The incline $h$, perforated at the upper end, in combination with the chain $l$ and scrapers $i$, substantially as specified.

3. The separating-fork $o$, receiving the straw, and to which a tossing movement is communicated, as set forth.

4. The shaft $u$, giving motion to the elevators, and also to the stacking apron or chain, substantially as set forth.

Signed by me this 4th day of November, A. D. 1872.

DENNIS O. B. LADD.

Witnesses:
P. E. MERRIHEW,
JOHN B. WINSLOW,
ELBERT O. HAND.